United States Patent [19]

Chuwman et al.

[11] Patent Number: 4,512,446
[45] Date of Patent: Apr. 23, 1985

[54] PIN-SLIDING CALIPER DISC BRAKE WITH BOOT PROTECTOR

[75] Inventors: Tsutomu Chuwman, Toyota; Tetsu Hagino, Nagoya; Shozaburo Tsuchida, Susono, all of Japan

[73] Assignee: Toyota Jidosha Kabushiki Kaisha, Toyota, Japan

[21] Appl. No.: 490,168

[22] Filed: Apr. 29, 1983

[30] Foreign Application Priority Data

Dec. 27, 1982 [JP] Japan .................. 57-197026[U]

[51] Int. Cl.$^3$ .............................................. F16D 65/00
[52] U.S. Cl. .................. 188/73.38; 188/73.39; 188/73.45; 188/264 G
[58] Field of Search ............. 188/73.38, 73.39, 73.45, 188/73.44, 73.47, 73.43, 73.37, 73.36, 73.35, 73.31, 205 A, 71.6, 264 R, 264 G, 71.1, 218 A, 264 AA, 264 A, 71.5; 301/6 R, 6 WB, 6 CS, 6 A

[56] References Cited

U.S. PATENT DOCUMENTS 3,592,303 7/1971 Tincher .................. 188/264 G
4,162,721 7/1979 Moriya .................. 188/73.45 X

FOREIGN PATENT DOCUMENTS 2029532 3/1980 United Kingdom ......... 188/264 G
2074265 10/1981 United Kingdom ......... 188/71.6

Primary Examiner—Douglas C. Butler
Attorney, Agent, or Firm—Oblon, Fisher, Spivak, McClelland & Maier

[57] ABSTRACT

A disc brake of pin-sliding caliper type having a boot protector including an extension of a liner disposed between a side end surface of a brake pad and an opposite torque receiving surface of a torque member movably supporting the brake pad toward and away from a friction surface of a disc rotor axially thereof. The boot protector protects from heat a boot covering an exposed portion of a slide pin which guides a caliper to urge the brake pad against the disc rotor. The protective extension of the liner extends along an axis of rotation of the rotor away from one end of the torque receiving surface remote from the rotor axially thereof, and is interposed between the boot and a heat source such as the brake pad and the rotor. The liner is preferably provided with a resilient section biasing the brake pad in a direction parallel to the surface of the disc rotor to thereby serve as an anti-rattle spring. The boot protector may further include another extension of the liner extending substantially radially outwardly of the rotor away from another end of the torque receiving surface proximate to the periphery of the rotor radially thereof.

16 Claims, 4 Drawing Figures

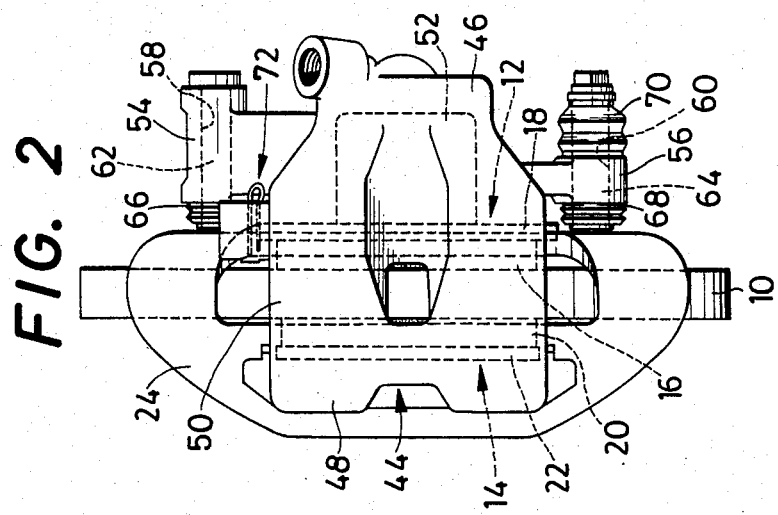

PIN-SLIDING CALIPER DISC BRAKE WITH BOOT PROTECTOR

BACKGROUND OF THE INVENTION

1. Field of the Invention

The present invention relates generally to a disc brake of pin-sliding caliper type, and more particularly to such disc brake having a protector protecting a boot for slide pins against damage due to heat applied to the boot.

2. Description of the Prior Art

In the art of a disc brake for automotive vehicles wherein a brake is applied repeatedly under high load, it is generally recognized that the disc brake is subject to heat accumulation due to friction which takes place between a disc rotor and brake pads with a resulting elevated temperature of the rotor and the pads. In such condition, dust boots of rubber or other similar soft materials covering exposed portions of caliper slide pins are exposed to radiant heat and a blast of heated air from the high-temperature parts, and tend to be damaged or deteriorated by heat, whereby the service life of the boots is disadvantageously reduced.

SUMMARY OF THE INVENTION

It is accordingly an object of the present invention to provide an improved disc brake of the type having a pin-sliding caliper, which comprises means for protecting boots for slide pins against damage thereof due to heat at the lowest possible cost.

Another object of the invention is to provide such boot protecting means usable for a pin-sliding caliper type of disc brake having a liner disposed between a side end surface of a brake pad and an opposite torque receiving surface of a torque member movably supporting the brake pad toward and away from a friction surface of a disc rotor, said liner being fixed to the torque member and providing a sliding surface for the brake pad.

According to the present invention, there is provided a disc brake for a vehicle having a wheel, comprising a disc rotor having friction surfaces on opposite sides thereof and rotatable integrally with the wheel; a pair of brake pads disposed on the opposite sides of the disc rotor; a torque member movably supporting the pair of brake pads toward and away from the friction surfaces of the disc rotor along an axis of rotation thereof and receiving a frictional drag torque force from the brake pads; a caliper straddling the brake pads and a peripheral portion of the disc rotor and having on its one side a hydraulic cylinder; slide pins extending along the axis of the disc rotor from one of the caliper and the torque member and slidably engaging mating bores formed in the other of the caliper and the torque member to thereby guide the caliper along the axis of the rotor; boots enclosing exposed portions of the slide pins between the torque member and the caliper; a liner made of sheet-like material and disposed in at least one of clearances formed between side end surfaces of the brake pads and torque receiving surfaces of the torque member opposite to the side end surfaces, the liner being fixed to the torque member and providing a sliding surface for the brake pad; and a boot protector for protecting one of the boots against damage thereof due to heat applied thereto from a heat source including the brake pads and the disc rotor, the boot protector comprising an extension of the liner extending along the axis of the disc rotor away from one end of the torque receiving surface remote from the disc rotor axially thereof, the extension being interposed between the boot and the heat source.

In accordance with the present invention, there is provided a boot protector for protecting from heat a boot which covers an exposed portion of a slide pin in a vehicle disc brake of pin-sliding caliper type including: (a) a disc rotor having friction surfaces on opposite sides thereof and rotatable with a wheel of a vehicle; (b) a pair of brake pads disposed on the opposite sides of the disc rotor; (c) a torque member movably supporting the pair of brake pads toward and away from the friction surfaces of the disc rotor along an axis of rotation thereof and receiving a frictional drag force from the brake pads; (d) a caliper straddling the brake pads and a peripheral portion of the disc rotor and having on its one side a hydraulic cylinder; and (e) a liner made of sheet-like material and disposed between a side end surface of one of the brake pads and an opposite torque receiving surface of the torque member, the liner being fixed to the torque member and providing a sliding surface for said one brake pad, and wherein said slide pin extends along the axis of rotation of the disc rotor from one of the caliper and the torque member and slidably engaging a mating bore formed in the other of the caliper and the torque member to thereby guide the caliper along the axis of the rotor. The boot protector protects the boot between the torque member and the caliper against damage thereof due to heat applied thereto from a heat source including the brake pad and the disc rotor. The boot protector comprises an extension of the liner extending along the axis of the disc rotor away from one end of the torque receiving surface remote from the disc rotor axially thereof, and the extension is interposed between the boot and the heat source.

In a common disc brake of a pin-sliding caliper type to which the present invention is applicable, the slide pins are usually positioned adjacent the torque receiving surfaces of the torque member, and the liners are provided so as to extend along these torque receiving surfaces. This arrangement permits utilization of the liner, according to the invention, as a protector for protecting a boot on the slide pin by means of giving the liner a greater width than usually required and providing an extension of the increased width extending away from the torque receiving surface so that the extension covers the boot.

In the disc brake constructed according to the invention, the boot protector is formed integrally with the liner which is fixed to the torque member. Therefore, there is no need of providing separate means for fixing the boot protector to the torque member, and consequently the protector is provided at less cost. Further, the boot protector provided according to the invention as an integral part of the liner which is inherently kept in contact with the torque receiving surface of the torque member, is supported by the torque member through the liner and is thus less likely to be bent toward and finally contact with the boot, whereby the possibility of damage to the boot due to contact with the protector is eliminated.

BRIEF DESCRIPTION OF THE DRAWINGS

The above and other objects, features and advantages of the present invention will become more apparent from reading the following description of the preferred embodiment taken in connection with the accompanying drawings in which:

FIG. 1 is a front elevational view of one embodiment of a disc brake of the invention;

FIG. 2 is a side elevational view of the disc brake of FIG. 1;

DETAILED DESCRIPTION OF THE PREFERRED EMBODIMENT

Figure 3:
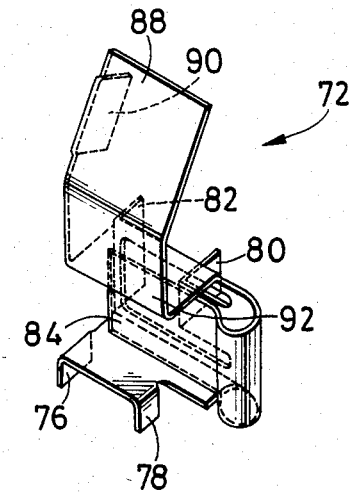
FIG. 3 is a perspective view illustrating a brake pad liner and a boot protector integral with the liner used in the disc brake of the invention.

Referring to FIGS. 1 and 2, there is shown a disc brake of the invention wherein a disc rotor 10 is rotatable integrally with a vehicle wheel (not shown). On opposite sides of the disc rotor 10 are disposed a pair of brake pads, an inner pad 12 and an outer pad 14 which face opposite friction surfaces on a peripheral portion of the disc rotor. The inner pad 12 consists of a semi-metallic friction member 16 made of metal powder particles, wires, fibers or similar forms of metallic materials bonded with synthetic resin, rubber or other organic binders, and a backing plate 18 of metal secured to an outer surface of the friction member 16. Similarly, the outer pad 14 consists of a friction member 20 and a backing plate 22.

As is apparent from FIG. 1, the inner and outer pads 12, 14 are positioned so as to face an extreme front portion of the disc rotor, i.e., a peripheral portion of the rotor extremely forward with respect to a central portion of the rotor as viewed from the rear toward the front of the vehicle. The brake pads 12, 14 are supported or carried by a torque member 24 movably toward and away from friction surfaces of the disc rotor along an axis of rotation thereof. The torque member 24 which is a saddle-like member formed by bending of a generally planar material having a large central opening, straddles over the peripheral portion of the disc rotor 10, and is secured with bolts 28 to a non-rotatable member 26 located adjacent the disc rotor 10. A portion of the torque member 24 at which it is secured to the non-rotatable member 26 is a planar portion 30 parallel to the friction surfaces of the disc rotor 10. In this planar portion 30, there is formed as a part of the said central opening a pad accommodating opening within which the inner pad 12 is received. The pad accommodating opening is provided, at opposite sides thereof, with torque receiving surfaces 36, 38 which are, opposite to end surfaces at both side ends of the inner pad 12. More specifically, the inner pad 12 is received in the pad accommodating opening such that end surfaces 32, 34 at both ends of the backing plate 18 are kept in facing relation with the respective torque receiving surfaces 36, 38 while slight clearances are left between the side end surfaces 32, 34 and the torque receiving surfaces 36, 38, respectively. The backing plate 18 has a pair of rectangular ears 40 and 42 protruding from the respective side end surfaces 32 and 34 laterally of the brake pad 12, and the planar portion 30 has a pair of mating rectangular recesses which engage the rectangular ears 40 and 42 in sliding contact so that the inner pad 12 is movable axially of the disc rotor 10 while it is positioned radially of the rotor by the ears 40, 42 and the mating recesses.

A caliper 44 which straddles over the peripheral portion of the disc rotor 10 and the brake pads 12, 14, includes a hydraulic cylinder 46 facing the backing plate 18 of the inner pad 12, a reaction portion 48 facing the backing plate 22 of the outer pad 14, and a connecting portion 50 extending over the periphery of the disc rotor 10 between the hydraulic cylinder portion 46 and the reaction portion 48 so as to connect these two portions such that the caliper 44 is of generally C-shaped structure as a whole. The hydraulic cylinder portion 46 has a cylinder bore in which is slidably received a piston 52 movable in a direction normal to the friction surface of the disc rotor 10. The cylinder portion 46 further includes a pair of arms 54 and 56 outwardly extending substantially circumferentially of the disc rotor 10. The extension arms 54, 56 have bores 58 and 60, respectively, through which are slidably inserted a corresponding pair of slide pins 62 and 64 extending from the torque member 24 perpendicularly to the surface of the rotor 10, i.e., along the axis of rotation thereof. Accordingly, the caliper 44 is movable in a direction normal to the friction surfaces of the rotor while it is guided by the slide pins 62, 64 axially of the disc rotor. To protect the slide pins 62 and 64 from water, dust and dirt, and other foreign matters, dust boots 66, 68 and 70 are provided to enclose or cover exposed portions of the pins extending out of the mating bores 58 and 60.

Between the side end surfaces 32, 34 of the inner pad 12 and the opposite torque receiving surfaces 36, 38 of the torque member 24, there are interposed liners 72 and 74, respectively. The liner 74 is a commonly used liner of stainless steel sheet which is shaped by bending it along the torque receiving surface 38 and the inner surfaces defining the rectangular recess 73. This liner 74 is fixed to the torque member 24 and provides a sliding surface to guide the inner pad 12.

Figure 4:
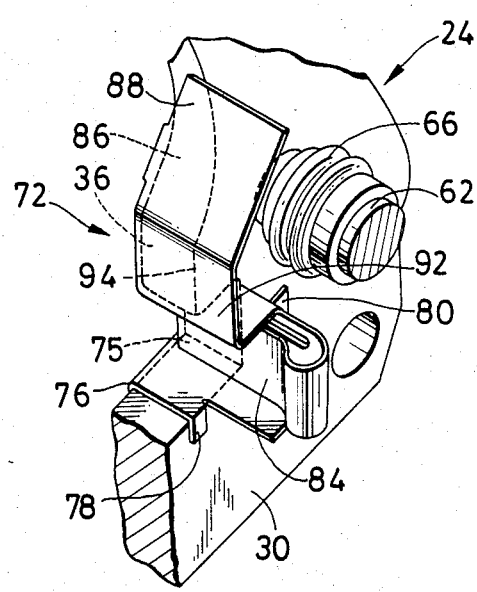
FIG. 4 is a perspective view showing the liner and the protector in the form of an integral unit attached to a torque member of the disc brake.

On the other hand, the liner 72 which are shown in enlargement in FIGS. 3 and 4 is made of a spring sheet of stainless steel which is bent along the torque receiving surface 36 of the torque member 24 and the inner surfaces defining the rectangular recess 75. The liner 72 has four lugs 76, 78, 80 and 82 which serve to grip the torque member 24 at its portions near the rectangular recess 75 thus fixing the liner 72 to the torque member 24. While this liner 72 provides another sliding surface to guide the inner pad 12, it also function as an anti-rattle spring because it includes a resilient section 84. More specifically stated, a portion of the liner 72 facing the bottom surface of the rectangular recess 75 is extended out of the recess in a direction away from the disc rotor 10, and the end of the extension is turned through 180°, the turned end extending in the reverse direction toward the disc rotor to thereby form the resilient section 84 of generally U-shaped loop-spring structure. This loop-spring resilient section 84 biases the inner pad 12 downwardly as seen in FIG. 1, that is, in a direction of rotation of the disc rotor that causes a forward movement of a vehicle on which the disc brake is mounted.

The torque member 24 has a slant surface 86 adjacent the torque receiving surface 36. As clearly shown in FIG. 1, the slant surface 86 extends substantially radially of the disc rotor 10 from the end of the torque receiving surface on the side adjacent to the periphery of the rotor. The slant surface 86 is inclined at an angle to the torque receiving surface in a direction away from the side end surface of the inner pad 12. In the meantime, the liner 72 has an extension 88 which extends substantially along the slant surface 86, i.e., substantially radially outwardly of the disc rotor 10. While the slant surface 86 is slightly curved as shown in FIGS. 2 and 4, the radial extension 88 is truly a flat planar portion whereby a small gap is left between the slant surface 86 and the radial extension 88. This small gap is closed by a bent part 90 which is bent from the end of the radial extension 88 axially proximate to the disc rotor 10 so that it extends in parallel to the friction surface of the rotor as shown in FIGS. 3 and 4.

Another extension 92 is provided on the side of the liner 72 remote from the disc rotor axially thereof. In other words, this extension 92 extends from the liner 72 axially of the disc rotor in a direction away from an end 94 of the torque receiving surface 36, which end 94 is located remote from the disc rotor 10 axially thereof. It is preferable that this axial extension 92 extends radially more than 5 mm from the axial end 94. In this specific embodiment, however, the distance of the extension 92 is about 10 mm. It is important to note that the extension 92 applies to a C-shaped portion of the liner 72 disposed along the inner surfaces of the rectangular recess 75 and to the radial extension 88, as well as to the portion of the liner 72 lying on the torque receiving surface 36, over the same distance in the axial direction of the rotor 10, whereby the axial extension 92 suitably covers or protects a portion of the boot 66 which would be subject to radiant heat from the inner pad 12 and the rotor 10 if the extension was not provided.

When the hydraulic cylinder 46 is fed with brake fluid under pressure, the piston 52 is moved to force the inner pad 12 against one of the two friction surfaces of the disc rotor 10 and by reaction, the reaction portion 48 of the caliper 44 urges the outer pad 14 onto the other friction surface of the rotor 10, whereby the rotation of the disc rotor is restrained through kinetic friction between the rotor and the brake pads. Upon each brake application, kinetic energy of the rotating disc rotor 10 is converted into a frictional heat which is conducted through the rotor 10 and the pads 12, 14 to other components of the disc brake and diffused into the surrounding air. When the brake is continuously or repeatedly applied under a high-load condition, however, the diffusion of heat into the surrounding air tends to be insufficient and the temperature of the disc rotor 10 and the brake pads 12, 14 will be elevated. Thus, an amount of the radiant heat produced from these parts are increased. This thermal environment of the disc brake becomes serious especially when the friction members 16 and 20 of the brake pads 12 and 14 are made of semi-metallic material of high thermal conductivity as in the present embodiment. In this instance, the backing plates 18 and 22 are heated to an appreciable extent. It is also noted that the air heated by the pads 12, 14 and the rotor 10 flows upward and consequently the dust boot 66 located upwardly of the pads is also exposed to this flow of the heated air. In a conventional disc brake, therefore, a boot like the boot 66 is more likely to be damaged by heat. However, the boot 66 of the disc brake according to the instant invention is effectively protected by the extensions 88 and 92 of the liner 72 which are interposed between the boot 66, and the inner pad 12 and the disc rotor 10 as previously discussed. In addition, the boot 66 is protected by the bent part 90 against exposure to radiant heat and high-temperature air stream which otherwise reach the boot 66 through the gap formed between the extension 88 and the slant surface 86 on the torque member 24. Thus, means are provided to minimize the damage of the boot 66 due to heat and thereby improve the durability or service life thereof.

In the present embodiment wherein the brake pads 12 and 14 are located at the front portion of the disc rotor 10 and consequently the boot 66 located upwardly of the pads is more likely to be subject to damage due to heat, the boot protector consisting of the extensions 88 and 92 of the liner 72 is disposed between the boot 66 and the inner pad 12. Stated another way, the boot protector is an extension of an anti-rattle spring which consists of the resilient section 84 and a fixing portion by which the anti-rattle spring is secured to the torque member 24, that is, the boot protector is formed integrally with the fixing portion of the anti-rattle spring whose resilient section 84 acts as a liner.

In the case where the brake pads 12, 14 are located almost at the top of the disc rotor 10, the boot 66 located at the rear of the pad 12 is exposed not only to radiant heat from the pad 12 and the rotor 10 but also to high-temperature air flowing rearwardly of the rotor during a forward run of the vehicle. Therefore, it is required to provide, as in the previous embodiment, a boot protector which is formed integrally with the liner 72 also functioning as an anti-rattle spring. In this instance, the opposite boot 68 is also considerably exposed to heat and thus preferably protected by a boot protector which is an extension of the liner 74. This situation is almost the same when the brake pads are located at an intermediate angular position of a quadrant of the disc rotor defined by the front and upper extremity points on the periphery of the rotor.

Although the foregoing embodiment of the disc brake uses caliper slide pins secured to the torque member, the present invention may be equally applied to a disc brake wherein the slide pins are secured to the caliper.

It is to be understood that various other changes, variations, modifications and improvements may be made to those skilled in the art without departing from the scope of the appended claims.

What is claimed is:

1. A disc brake for a vehicle having a wheel, comprising:
    a disc rotor having friction surface on opposite sides thereof and rotatable integrally with said wheel;
    a pair of brake pads disposed on said opposite sides of the disc rotor;
    a torque member movably supporting said pair of brake pads toward and away from said friction surfaces of the disc rotor along an axis of rotation thereof, said torque member supporting at least one boot and receiving a frictional drag torque force from said brake pads;
    a caliper straddling said brake pads and a peripheral portion of said disc rotor and having on one side thereof a hydraulic cylinder;
    at least one slide pin extending along said axis of the disc rotor from one of said caliper and said torque member and slidably engaging mating bores formed in the other of said caliper and said torque member to thereby guide said caliper along said axis; at least one boot enclosing exposed portions of said at least one slide pin between said torque member and said caliper; and a liner made of sheet-like material and radially disposed in at least one clearance formed between side end surfaces of said brake pads and torque receiving surfaces of said torque member opposite to said side end surfaces, said liner being fixed to said torque member and providing a sliding surface for said brake pads; and a boot protector including means for protecting said at least one boot against damage thereof due to heat applied thereto from a heat source including one of said brake pads which is located on the same side of said disc rotor as said at least one boot, said boot protector including a first extension of said liner extending more than 5 mm along said axis of the disc rotor away from one of said torque receiving surface remote from said disc rotor axially thereof, said first extension of the liner radially extending between said at least one boot and said one of the brake pads.

2. A disc brake as recited in claim 1, wherein said liner comprises a resilient section biasing said brake pad in a direction parallel to said friction surfaces of the disc rotor and thereby serving as an anti-rattle spring.

3. A disc brake as recited in claim 2, wherein centers of said brake pads circumferentially of the disc rotor are positioned so as to face said peripheral portion of the disc rotor falling within an angular range substantially defined by an upper extremity point on the periphery of the disc rotor and a front extremity point of same, said resilient section of said liner biasing said brake pad in a direction of rotation of the disc rotor that causes said vehicle to move forward, and said boot protector protecting said one of the boots located behind said brake pad as viewed in said direction of rotation.

4. A disc brake as recited in claim 1, wherein said boot protector extends about 10 mm from said one end of the torque receiving surface.

5. A disc brake as recited in claim 1, wherein said boot protector further comprises another extension of said liner extending substantially radially outwardly of the disc rotor away from another end of the torque receiving surface proximate to the periphery of the disc rotor radially thereof.

6. A disc brake as recited in claim 5, wherein said torque member has a slant surface extending substantially radially of the disc rotor from said another end of the torque receiving surface, said slant surface inclining at an angle to said torque receiving surface in a direction away from said side end surface of the brake pad, said another extension extending along said slant surface.

7. A disc brake as recited in claim 1, wherein said brake pad has ears protruding from said side end surfaces laterally of the brake pad along said friction surfaces, said torque receiving surfaces having recesses engaging said ears, and wherein a portion of said liner disposed along inner surfaces of the torque member defining said recess has another extension extending from one end thereof remote from the disc rotor along said axis of rotation in a direction away from the disc rotor, said another extension of the liner cooperating with said extension to constitute said boot protector.

8. A disc brake as recited in claim 1, wherein said liner includes a portion which is spaced apart from said torque receiving member with a clearance left therebetween and which has, at one end thereof proximate to said disc rotor axially thereof, a bent part extending substantially in parallel to said friction surfaces of the disc rotor and closing said clearance.

9. A disc brake as recited in claim 1, wherein each of said brake pads includes a semi-metallic friction member made of particulate and/or fibrous metallic materials bonded with an organic binder.

10. A disc brake as recited in claim 1, wherein said boot protector further comprises a second radial extension having a surface slanted with respect to said first radial extension.

11. A disc brake as recited in claim 10, wherein said second radial extension includes a bent portion which extends towards said at least one boot.

12. A boot protector for protecting from heat a boot which covers an exposed portion of a slide pin in a disc brake of pin-sliding caliper type for a vehicle, comprising:

a disc rotor having friction surfaces on opposite sides thereof and rotatable with a wheel of the vehicle;

a pair of brake pads disposed on said opposite sides of the disc rotor;

a torque member movably supporting said boot and said pair of brake pads toward and away from said friction surfaces of the disc rotor along an axis of rotation thereof and receiving a frictional drag force from said brake pads;

a caliper straddling said brake pads and a peripheral portion of the disc rotor and having on its one side a hydraulic cylinder; and a liner made of sheet-like material and radially disposed between a side end surface of one of the brake pads and an opposite torque receiving surface of said torque member, the liner being fixed to the torque member and providing a sliding surface for said one of the brake pads, and wherein said slide pin extends along said axis of the disc rotor from one of said caliper and said torque member and slidably engaging a mating bore formed in the other of the caliper and the torque member to thereby guide the caliper along said axis, said boot protector including a first extension of the liner radially extending more than 5 mm along said axis of the disc rotor away from one end of said torque receiving surface remote from the disc rotor axially thereof, said extension of the liner radially extending between said boot and one of said brake pads.

13. A boot protector as recited in claim 12, wherein said boot protector further comprises another extension of said liner extending substantially radially outwardly of the disc rotor away from another end of the torque receiving surface proximate to the periphery of the disc rotor radially thereof.

14. A boot protector as recited in claim 12, wherein said one of the brake pads has an ear protruding from said side end surface laterally of said one brake pad along said friction surfaces, said torque receiving surface having a recess engaging said ear, and which further comprises another extension from one end of a portion of said liner disposed along inner surfaces of the torque member defining said recess, said one end of said portion being remote from the disc rotor, said another extension extending from said one end along said axis of rotation in a direction away from the disc rotor.

15. A boot protector as recited in claim 12, wherein said boot protector further comprises a second radial extension having a surface slanted with respect to said first radial extension.

16. A boot protector as recited in claim 15, wherein said second radial extension includes a bent portion which extends towards said at least one boot.

* * * * *